United States Patent Office 3,448,138
Patented June 3, 1969

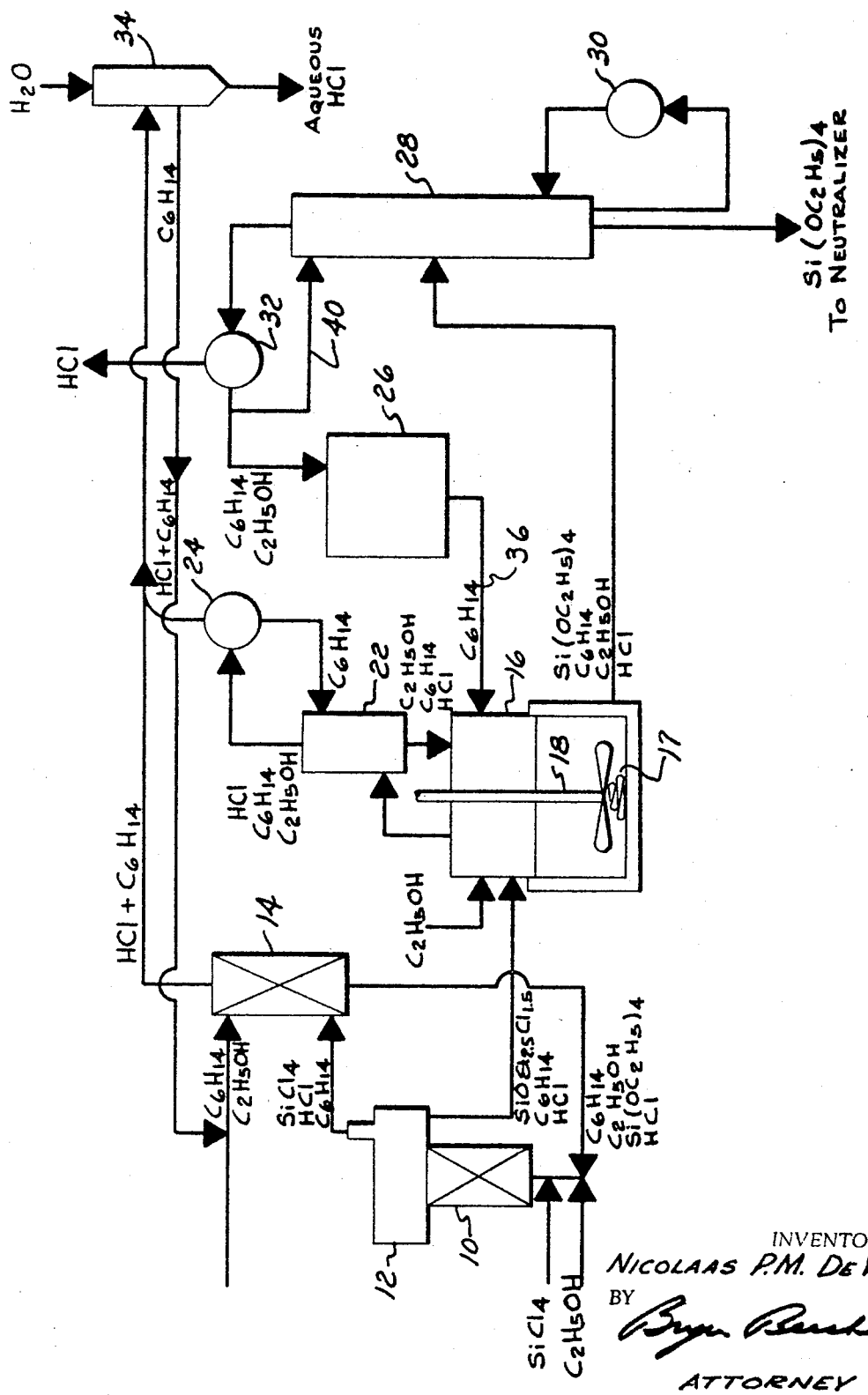

3,448,138
PRODUCTION OF HYDROCARBONOXY SILANES
Nicolaas P. M. de Wit, Tecumseh, Mich., assignor to Stauffer Chemical Company, New York, N.Y., a corporation of Delaware
Filed June 20, 1966, Ser. No. 558,899
Int. Cl. C07f 7/14
U.S. Cl. 260—448.8                10 Claims This invention relates to a process for the manufacture of hydrocarbonoxy silanes through the treatment of halosilanes, especially chlorides, with alcohols and phenols, particularly primary alcohols. The invention is presently considered of greatest commercial potential as applied to the production of tetraethyl orthosilicate and partially hydrolyzed tetraethyl orthosilicate but is not limited to such application. Thus, it may be used with advantage in the preparation, for example, of methyl-, phenyl-, and vinyl-triethoxysilane, propyl- and methyl-trimethoxysilane, etc.

In general, the scope of application of the process herein is indicated by the following equations illustrating the reactions involved in its execution. X in these equations represents a halogen atom, normally chloride as above suggested, while R represents an alkyl, cyclo-alkyl or aryl group. If R is an alkyl group it may contain from 1 to 16, more preferably 1 to 8, carbon atoms. In any case, R may contain substituents which do not interfere with reaction or which do not readily decompose or react with acid. As exemplary of substituents contemplated may be mentioned ester and nitrile groups and unsaturated radicals, as vinyl.

(1) $\quad SiX_4 + ROH \rightleftarrows Si(OR)X_3 + HX\uparrow$ (2) $\quad Si(OR)X_3 + ROH \rightleftarrows Si(OR)_2X_2 + HX\uparrow$ (3) $\quad Si(OR)_2X_2 + ROH \rightleftarrows SiOR_3X + HX\uparrow$ (4) $\quad SiOR_3X + ROH \rightleftarrows Si(OR)_4 + HX\uparrow$ The above reactions proceed at progressively decreasing rates and are reversible. Because of the reversibility, it is desirable, if not essential, either to carry the reactions to completion by adding an acid acceptor (bases, amines, ammonia, ortho-formates, epoxides, etc.) or provides for prompt and continuous removal of the dissolved acid from the reaction mass as through the use of vacuum, nitrogen, or the like. Inactivation or separation of the acid is also highly desirbale for the further reason that it may react with the alcohol or phenol to form the alkyl or aryl halide or di-alkyl or aryl ether with production of water, resulting in hydrolysis of the product and its subsequent conversion to generally undesirable "high boilers." Moreover, the acid, unless separated or inactivated, may attack, adversely, functional groups carried by the alcohol or phenol.

From an economic stand point, separation of the acid as such from the reaction zone is manifestly to be preferred over the employment of an acid acceptor. However, processes heretobefore proposed, involving separation of the acid as such from the reaction zone or zones, have proven most inefficient in practice. Using one of these processes, the employment of large quantities of neutralizing agent is, in any event, ultimately necessary in the final processing of the product. This, of course, gives rise to the production of commensurately large amounts of salt which must be removed by filtration. A major expense in the operation of such a process has relation to the operation and maintenance of the filtering equipment.

A further disadvantatge of the prior processes resides in the fact that the by-product acid is so contaminated with the alcohol or phenol and other impurities that it has little salability. Moreover, serious troubles derive from the presence of tri- and/or tetra-halo silanes in the acid gas from the reactor. These materials cause frequent plugging of scrubbers and absorbers, requiring shutdowns and time consuming clean-ups.

A principal object of the present invention is to provide a process of improved efficiency.

Another object is to provide a process in the execution of which the several reactions are caused to proceed at rates having an order of magnitude higher than has been hitherto possible.

A further object is to provide a process which yields the acid by-product in a high state of purity.

Still another object is to provide a process which, as industrially practiced, has a low fuel demand.

A still further object is the provision of a process yielding a product free of acid or containing only a trace of acid, to the end that the final neutralization procedure does not give rise to excessive salt formation.

Other objects, features, and adavntages of the invention will be apparent from the following description of the process as applied in the manufacture of tetraethyl orthosilicate. The description will proceed with reference to the accompanying drawing diagrammatically illustrating a system of apparatus suitable for the practice of the process.

In the drawing, the numeral 10 denotes a first reactor which communicates with an expansion chamber 12, itself communicating with a scrubber 14. Reactor 10 is preferably baffled or packed, as with polypropylene. Minimal longitudinal mixing along with good gas-liquid contact at modest pressure drop results in improved reaction selectivity and a relatively pure gas, hardly contaminated with non-esterified starting material.

Unit 14 is desirably of sieve-type tray design. Thus, it may accord, for example, with the gas-liquid contactor described on page 40 of the Jan. 3, 1966 issue of "Chemical Engineering." Alternatively, a simple packed column may suffice.

Rightward of reactor 10 is a second reactor 16 equipped with a stirrer or agitator 18 and a heating coil 17.

Upward of the second reactor 16, which will be noted as jacketed, is shown a second scrubber unit 22 of any suitable conventional construction having communication with a condenser 24. Feeding into reactor 16 is a reservoir tank 26 supplied from a stripper 28 having a reboiler 30 associated therewith. Stripping column 28 will be seen opening to a second condenser 32. Rightward of such condenser is a gas absorber 34.

The reaction in unit 10 is carried out adiabatically in liquid phase and utilizes as starting materials silicon tetrachloride and ethanol, these being admitted to the reactor in controlled proportions. Thus, for optimum results the mole ratio of silicon tetrachloride to ethanol should approximate 1:2.5.

The reaction, which is slightly endothermic, proceeds with production of hydrogen chloride. To lessen the solubility of the hydrogen chloride in the reaction mixture, there is introduced into the reactor 10 a controlled amount of a suitable hydrocarbon solvent, preferably hexane, in company with additional ethanol. In this way, the temperature of the reaction mixture may be maintained at a desirably low level, e.g. around 0° C., by the heat removed through the vaporization of the hydrogen chloride.

The hexane-ethanol mixture is derived from the scrubber unit 14 wherein it is applied to wash the vapors from the expansion chamber 12. As indicated in the drawing, these vapors are comprised of unreacted silicon tetrachloride, hydrogen chloride, and hexane.

The alcohol in the hexane-ethanol mixture fed to the scrubber 14 reacts with any unreacted silicon tetrachloride to convert the same predominately to relatively high-boiling tetraethyl orthosilicate which is returned to the reactor 10 as part of the botom product of the scrubber. The vapors from the scrubber, consisting essentially of hydrogen chloride and hexane, are conveyed to the absorber 34, which will be subsequently referred to.

It is to be understood that the reactor 10 is a continuous reactor and that the inter-mixing of the reactants therein is enhanced by the evolution of the hydrogen chloride.

The liquid product from the reactor 10 is passed from the expansion chamber 12 to the second reactor 16. This product is comprised in the main of $Si(OC_2H_5)_2Cl_2$ and $Si(OC_2H_5)_3Cl$.

There is also introduced into reactor 16 additional ethanol in 5 percent excess based on the total alcohol required for the overall reaction.

The reaction in reactor 16 proceeds with continuous stirring of the reactants which are maintained at reflux temperatures, i.e. 50–62° C. and at a pressure approximating that prevailing in reactor 10. The overhead from reactor 16 is introduced into the second scrubber unit 22 operated to roughly separate HCl and hexane from ethanol and reaction intermediates. The hexane condensate from the condenser, which condensate contains little HCl, is returned to the scrubber 22, while the overhead consisting for the most part of hydrogen chloride and hexane is passed to the absorber 34.

Most of the hexane introduced into reactor 16 is derived from line 36 inter-connecting the reactor and reservoir tank 26. The hexane serves to reduce the partial pressure of the hydrogen chloride above the fluid reaction mixture and the hydrogen chloride solubility and dissociation in the mixture. As a consequence, relatively little hydrogen chloride becomes dissolved in the mixture, so that the product from the reactor 16 normally contains not in excess of 3 percent hydrogen chloride.

It has been determined that the conversion to tetraethyl orthosilicate in the reactor 16 is quantitative, the only losses being mechanical.

The bottom product of reactor 16 is passed to the stripping column 28 maintained at the temperature required to remove the hexane, ethanol, and hydrogen chloride from the tetraethyl orthosilicate. These vapors are passed to condenser 32 wherein the hydrogen chloride is separated from the hexane and alcohol which are passed to the reservoir tank 26. Line 40 enables re-cycling of hexane-ethanol mixture to the column 28, a re-cycle rate of 1:1 being usually employed.

The overhead from scrubbers 14 and 22 which is fed into the absorber 34 normally comprises about 98 percent of the total hydrogen chloride by-product. As shown, the hexane separated in the absorber is returned to the hexane feed line of scrubber 14.

The HCl vented from condenser 32 is not conveyed to the absorber 34 because it is somewhat contaminated with silicates and these would be prone to hydrolyze in the absorber with deposition of silica.

In further illustration of the invention, there is submitted below the material balances obtaining in a typical run. These figures are based on the production of a 4160 pound lot of ethyl silicate, which contained less than .05 percent chloride.

| Materials In | Materials Out |
|---|---|
| 1ST REACTOR | |
| SiCl₄............ 3,401<br>EtOH............ 2,302<br>Hexane.......... 1,071 | Product:<br>  $Si(OEt)_{2.5}(Cl)_{1.5}$........ 3,877<br>  Hexane............... 875<br>  HCl.................. 364<br>Vapors:<br>  EtOH................. 2<br>  Hexane............... 196<br>  HCl.................. 1,460 |
| 2ND REACTOR | |
| Product:<br>  $Si(OEt)_{2.5}(Cl)_{1.5}$.. 3,877<br>  Hexane.......... 875<br>  HCl............. 364<br>  Ethanol......... 1,387<br>Recycle:<br>  EtOH............ 181<br>  Hexane.......... 460<br>  HCl............. 73 | Product:<br>  $Si(OEt)_4$................ 4,160<br>  HCl.................. 146<br>  Hexane............... 483<br>  Ethanol.............. 185<br>Vapors:<br>  HCl.................. 1,386<br>  Hexane............... 852<br>  Ethanol.............. 3 |
| STRIPPER | |
| Feed:<br>  $Si(OEt)_4$........ 4,160<br>  Hexane.......... 483<br>  Ethanol......... 185<br>  HCl............. 146 | Product:<br>  $Si(OEt)_4$................ 4,160<br>  HCl.................. 20<br>Recycle:<br>  EtOH................. 181<br>  Hexane............... 460<br>  HCl.................. 73<br>Vapors:<br>  HCl.................. 53<br>  Hexane............... 23<br>  Ethanol.............. 4 |
| ABSORBER | |
| Feed:<br>  HCl............. 2,846<br>  Hexane.......... 1,048<br>  Ethanol......... 5<br>  Water........... 6,190<br>  Silicates....... negl. | 20° BeHCl Soln. (Incl. Ethanol)... 9,041<br>Hexane recycle.................. 1,048 |

Should it be desired to produce the tetraethyl orthosilicate in polymer form, it is only necessary to add the appropriate amount of water to the ethanol introduced into reactor 16. Thus, in this way the commercial material known as "Ethyl Silicate 40" may be expeditiously prepared. Alternatively, the product may be "condensed ethyl silicate" which is essentially a monomer. Ethyl Silicate 40, as is well understood in the art, is so named due to the fact that its available silica content is approximately 40 percent.

It should be readily appreciated that by the simple expedient of substituting methyltrichlorosilane for the silicon tetrachloride employed in the illustrated system, one may readily produce methyltriethoxysilane or with the addition of water, as above described, polymerized methyltriethoxysilane. It should be equally clear that if propyltrimethoxysilane (for further example) should be the desired product, one need only to employ as starting materials, propyltrichlorosilane and methanol. In this instance, it is advisable to use a pentane fraction rather than a hexane fraction as the solvent.

The term "halo-substituted silane" as used herein, is meant to embrace both silanes in which the only substituent group(s) is a halo group(s) and halo-silanes which are additionally substituted, as with an alkyl and/or aryl group.

The invention claimed is:

1. Process for the production of hydrocarbonoxy silanes which comprises (a) reacting, adibatically, a halo-substituted silane and a compound of the group consisting of phenols and alcohols in the presence of a solvent adapted to reduce the solubility in the reaction mixture of the hydrogen halide produced incident to the reaction, the reactants being employed in relative amounts yielding a mixture of halo-hydrocarbonoxy silanes and (b) reacting said last mixture in the presence of a solvent as defined with additional phenol or alcohol to convert the halo-hydrocarbonoxy silanes to the corresponding completely esterified product.

2. Process according to claim 1 as practiced using aliphatic alcohols containing from 1 to 8 carbon atoms.

3. Process according to claim 1 when reaction (b) is carried out in the presence of water so that the product is produced in a polymeric form.

4. Process according to claim 1 as effected using silicon tetrachloride and an aliphatic primary alcohol containing from 1 to 8 carbon atoms.

5. Process according to claim 1 as applied in the production of tetraethyl orthosilicate from silicon tetrachloride and ethanol.

6. Process according to claim 5 where a hexane fraction is employed as the solvent in both reaction (a) and reaction (b).

7. Process according to claim 5 where the silicon tetrachloride-ethanol ratio in reaction (a) is about 1:2.5.

8. Process according to claim 2 when reaction (b) is carried out in the presence of water so that the product is produced in a polymeric form.

9. Process according to claim 3 as applied in the production of tetraethyl orthosilicate from silicon tetrachloride and ethanol.

10. Process according to claim 6 where the silicon tetrachloride-ethanol mole ratio in reaction (a) is about 1:2.5.

References Cited
UNITED STATES PATENTS

| | | | |
|---|---|---|---|
| 1,725,620 | 8/1929 | Müller-Cunradi et al. | 260—448.8 |
| 2,484,394 | 10/1949 | Van Zwet | 260—448.8 |
| 2,647,874 | 8/1953 | Da Fano | 260—448.8 X |
| 3,232,972 | 2/1966 | Beanland | 260—448.8 |

TOBIAS E. LEVOW, *Primary Examiner.*

P. F. SHAVER, *Assistant Examiner.*

UNITED STATES PATENT OFFICE
CERTIFICATE OF CORRECTION

Patent No. 3,448,138                                              June 3, 1969

Nicolaas P. M. de Wit

It is certified that error appears in the above identified patent and that said Letters Patent are hereby corrected as shown below:

Column 4, in the table entitled "STRIPPER", opposite "Recycle:" cancel "181". Column 6, line 2, after "chloride-ethanol" insert -- mole --.

Signed and sealed this 21st day of April 1970.

(SEAL)
Attest:

Edward M. Fletcher, Jr.                        WILLIAM E. SCHUYLER, JR.
Attesting Officer                                  Commissioner of Patents